(12) United States Patent
Kesting et al.

(10) Patent No.: US 9,818,295 B2
(45) Date of Patent: Nov. 14, 2017

(54) METHODS AND SYSTEMS FOR DETECTING A CLOSURE OF A NAVIGABLE ELEMENT

(71) Applicant: TomTom Development Germany GmbH, Amsterdam (NL)

(72) Inventors: Arne Kesting, Berlin (DE); Stefan Lorkowski, Berlin (DE); Christian Lorenz, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 14/778,091

(22) PCT Filed: Mar. 20, 2014

(86) PCT No.: PCT/EP2014/055652
§ 371 (c)(1),
(2) Date: Sep. 18, 2015

(87) PCT Pub. No.: WO2014/147200
PCT Pub. Date: Sep. 25, 2014

(65) Prior Publication Data
US 2016/0275787 A1    Sep. 22, 2016

(30) Foreign Application Priority Data
Mar. 20, 2013   (GB) .................................. 1305131.3

(51) Int. Cl.
*G08G 1/00* (2006.01)
*G08C 15/00* (2006.01)
(Continued)

(52) U.S. Cl.
CPC ........... *G08G 1/0125* (2013.01); *G01C 21/32* (2013.01); *G01S 19/42* (2013.01); *G08G 1/0112* (2013.01); *G08G 1/0133* (2013.01)

(58) Field of Classification Search
USPC .......................................... 701/117; 370/230
See application file for complete search history.

(56) References Cited

U.S. PATENT DOCUMENTS 6,253,146 B1 *   6/2001   Hanson .............. G01C 21/3415
                                                        340/905
6,477,143 B1 *   11/2002  Ginossar ................. H04L 47/10
                                                        370/230
(Continued)

FOREIGN PATENT DOCUMENTS

CN    1879008 A    12/2006
CN    1909022 A    2/2007
(Continued)

OTHER PUBLICATIONS

International Search Report of International Application No. PCT/EP2014/055652 dated Jun. 13, 2014.
(Continued)

*Primary Examiner* — Tyler Paige

(57) ABSTRACT

A method of detecting the closure of a road element is disclosed; the road element being one of a set of alternative incoming or outgoing elements at a node in a network of navigable elements. A server obtains positional data relating to the position of a plurality of devices with respect to time traversing the node. A count is determined of the number of devices in a consecutive sequence of device selecting a given one of the navigable elements from among the set of elements. The count is compared to a predetermined threshold to determine whether another one of the elements is closed. The threshold is based upon the relative probability of the element to which the count relates being taken from the set of road elements.

16 Claims, 5 Drawing Sheets

(51) Int. Cl.
*G08G 1/01* (2006.01)
*G01C 21/32* (2006.01)
*G01S 19/42* (2010.01)

(56) References Cited

U.S. PATENT DOCUMENTS

| | | | |
|---|---|---|---|
| 6,633,812 B1* | 10/2003 | Martin | G01C 21/3453 |
| | | | 701/25 |
| 7,831,389 B2 | 11/2010 | Yamada | |
| 8,606,511 B2 | 12/2013 | Johnson | |
| 8,655,575 B2 | 2/2014 | Reghunath | |
| 8,803,705 B2 | 8/2014 | Li | |
| 8,930,123 B2 | 1/2015 | Srivastava | |
| 9,153,135 B2* | 10/2015 | Bantz | G08G 1/096741 |
| 2004/0073361 A1* | 4/2004 | Tzamaloukas | G01C 21/3691 |
| | | | 701/414 |
| 2005/0102098 A1 | 5/2005 | Montealegre et al. | |
| 2005/0131643 A1 | 6/2005 | Shaffer et al. | |
| 2007/0198177 A1 | 8/2007 | Yamada | |
| 2007/0244627 A1* | 10/2007 | Boss | G08G 1/0104 |
| | | | 701/117 |
| 2008/0057888 A1* | 3/2008 | Shoykhet | H04B 1/034 |
| | | | 455/161.1 |
| 2008/0077309 A1* | 3/2008 | Cobbold | G06Q 10/10 |
| | | | 701/117 |
| 2009/0112608 A1* | 4/2009 | Abu-Hakima | G06F 9/4868 |
| | | | 705/345 |
| 2009/0132673 A1* | 5/2009 | Sprigg | G08G 1/0104 |
| | | | 709/207 |
| 2010/0254282 A1* | 10/2010 | Chan | H04W 24/08 |
| | | | 370/253 |
| 2011/0118979 A1 | 5/2011 | Mao et al. | |
| 2011/0208646 A1* | 8/2011 | McMaster | G06Q 30/02 |
| | | | 705/39 |
| 2012/0109505 A1* | 5/2012 | Cumming | G01C 21/3492 |
| | | | 701/117 |
| 2012/0130625 A1 | 5/2012 | Srivastava | |
| 2012/0143492 A1 | 6/2012 | Johnson | |
| 2012/0169515 A1 | 7/2012 | Li | |
| 2012/0253646 A1 | 10/2012 | Reghunath | |
| 2013/0214939 A1* | 8/2013 | Washlow | G01S 7/003 |
| | | | 340/901 |
| 2013/0304333 A1 | 11/2013 | Fuehrer | |
| 2014/0074392 A1* | 3/2014 | Holm | G01C 21/3415 |
| | | | 701/400 |

FOREIGN PATENT DOCUMENTS

| | | |
|---|---|---|
| CN | 101526359 A | 9/2009 |
| CN | 102568238 A | 7/2012 |
| EP | 1096228 A1 | 5/2001 |
| EP | 2402911 A1 | 1/2012 |
| GB | 2428852 A | 2/2007 |
| WO | 0169569 A2 | 9/2001 |
| WO | 2010105712 A1 | 9/2010 |
| WO | 2012058952 A1 | 5/2012 |
| WO | 2014044784 A1 | 3/2014 |

OTHER PUBLICATIONS

Search Report of United Kingdom Application No. GB1305131.3 dated Feb. 20, 2014.
Further Search Report of United Kingdom Application No. GB1305131.3 dated Sep. 3, 2014.

* cited by examiner

METHODS AND SYSTEMS FOR DETECTING A CLOSURE OF A NAVIGABLE ELEMENT

CROSS-REFERENCES TO RELATED APPLICATIONS

The present application is a National Stage of International Application No. PCT/EP2014/055652, filed Mar. 20, 2014, and designating the United States, and which claims benefit to United Kingdom Patent Application No. 1305131.3 filed on Mar. 20, 2013. The entire content of these applications is incorporated herein by reference.

FIELD OF THE INVENTION

The present invention relates to methods and systems for detecting the closure of a navigable element, e.g. road element, in a navigable network of navigable elements connected by nodes. In particular the present invention relates to methods and systems for detecting the closure of one of a set of two or more alternative outgoing, or two or more alternative incoming, navigable elements at a node of the network of navigable elements using positional data relating to the movement of devices along each navigable element of the set with respect to time.

BACKGROUND TO THE INVENTION

Obtaining information about closures of navigable elements, e.g. roads of a road network, is important in a navigation system. The presence of a road closure has a significant impact upon routing through the road network. A road closure may be likened to a traffic jam associated with an "infinite delay", such that an alternative routing must be determined to avoid the affected road element(s). Knowledge of the existence of a road closure is of importance to road users even if they are not following a pre-calculated route. For example, if a user is following a familiar route, it is still useful for them to be aware if a road closure is present affecting the route so that they may determine an alternative route, with or without the assistance of a navigation system.

Road closure information may be provided to a user, e.g. together with other traffic information, during navigation along a route via an in-vehicle navigation device, such as a portable device (PND) or integrated device, or may be provided as an input to an Advanced Driver Assistance System (ADAS) device. Road closure information may also be used for route planning, e.g. by a navigation or ADAS device, before commencing a journey, or to recalculate a fastest route during a journey if conditions change during traversal along the route.

A road closure is typically a dynamic event, temporarily affecting a road element or elements, and it is therefore desirable to be able to obtain information relating to road closures in the context of a "live" system, i.e. indicative of the relatively current condition of the road network. The constraints on available processing resources and memory in the context of a "live" system present further challenges in determining road closure information in a "live" system.

Conventional systems for obtaining information about road closures typically rely upon data obtained from third parties. For example, such data may be included in "Traffic Message Channel" (TMC) messages that may be broadcast over an FM network, or other similar third party messages. Such information may be based upon data obtained from sources such as police reports, or road agencies/administrators. However, there are some drawbacks in relying upon third party data relating to road closures, since such data is not always accurate, and may not be up to date.

The Applicant has realised that there remains scope for improvement in methods and systems for obtaining information relating to the closure of a navigable element, e.g. for provision to users and/or navigation or ADAS devices.

SUMMARY OF THE INVENTION

In accordance with a first aspect of the invention there is provided a method of detecting the closure of a navigable element forming part of a network of navigable elements within a geographic area, wherein the network of navigable elements comprises a plurality of navigable elements connected by a plurality of nodes, the method comprising:

obtaining positional data relating to the movement of a plurality of devices along each one of a set of two or more alternative incoming navigable elements at a node of the network with respect to time;

using the positional data to determine a count of devices in a sequence of consecutive devices that have selected a given one of the set of two or more alternative incoming navigable elements from among the incoming navigable elements of the set; and comparing the count to a predetermined threshold to determine whether another one of the set of two or more alternative incoming navigable elements at the node is closed.

The present invention can be applied to determining a closure of one of a set of two or more alternative incoming navigable elements or one of a set of two or more alternative outgoing navigable elements at a node of a network of navigable elements.

In accordance with a second aspect of the invention there is provided a method of detecting the closure of a navigable element forming part of a network of navigable elements within a geographic area, wherein the network of navigable elements comprises a plurality of navigable elements connected by a plurality of nodes, the method comprising:

obtaining positional data relating to the movement of a plurality of devices along each one of a set of two or more alternative outgoing navigable elements at a node of the network with respect to time;

using the positional data to determine a count of devices in a sequence of consecutive devices selecting a given one of the set of two or more alternative outgoing navigable elements from among the outgoing navigable elements of the set; and comparing the count to a predetermined threshold to determine whether another one of the set of two or more alternative outgoing navigable elements at the node is closed.

It will be appreciated that the steps of the method may be implemented in conjunction with determining a closure affecting both one of a set of two or more incoming elements, and a closure affecting one of a set of two or more outgoing elements, at the same, or different nodes in the network of navigable elements.

In embodiments of the method in accordance with the first aspect of the invention, the navigable network preferably additionally comprises a set of two or more alternative outgoing navigable elements at the node, and the method further comprises: obtaining positional data relating to the movement of a plurality of devices along each one of the set of two or more alternative outgoing navigable elements at the node with respect to time; using the positional data to determine a count of devices in a sequence of consecutive devices selecting a given one of the set of two or more alternative outgoing navigable elements from among the outgoing navigable elements of the set; and comparing the count to a predetermined threshold to determine whether another one of the set of two or more alternative outgoing navigable elements at the node is closed.

Similarly, in embodiments of the method in accordance with the second aspect of the invention, the navigable network preferably additionally comprises a set of two or more alternative incoming navigable elements at the node, the method further comprising: obtaining positional data relating to the movement of a plurality of devices along each one of the set of two or more alternative incoming navigable elements at the node with respect to time; using the positional data to determine a count of devices in a sequence of consecutive devices that have selected a given one of the set of two or more alternative incoming navigable elements from among the incoming navigable elements of the set; and comparing the count to a predetermined threshold to determine whether another one of the set of two or more alternative incoming navigable elements at the node is closed.

It will be appreciated that any feature described by reference to the first aspect of the invention may equally be applied to embodiments in accordance with the second aspect of the invention and vice versa. Thus, methods described in relation to determining the closure of one of a set of two or more incoming navigable elements at a node are equally applicable to determining the closure of one of a set of two or more outgoing navigable elements at a node of a navigable network, unless the context demands otherwise. Where steps are described in relation to an outgoing navigable element and/or a set of two or more alternative outgoing navigable elements it will be appreciated that these may equally apply to an incoming navigable element and/or a set of two or more alternative incoming navigable elements, if not explicitly mentioned. If the method refers only to a navigable element of a set of alternative navigable elements, it will be appreciated that this may be an outgoing navigable element of a set of two or more alternative outgoing navigable elements, or an incoming navigable element of a set of two or more alternative incoming navigable elements, unless the context demands otherwise.

In accordance with the invention in its various aspects therefore, positional data relating to the movement of devices with respect to time along either a set of a plurality of alternative incoming navigable elements at a node or a set of a plurality of alternative outgoing navigable elements at a node is used, together with data indicative of a count of a consecutive sequence of devices selecting a given one of the relevant set of elements, to determine whether another one of the set of elements is closed. This is done by comparison of the count to a predetermined threshold. The threshold is chosen to be indicative of a closed state of another one of the set of navigable elements.

It has been found that by using the positional data together with a count of consecutive devices selecting a given one of either a set of alternative incoming navigable elements or a set of alternative outgoing navigable elements from the set in this manner, it is possible to determine closure information more accurately, and such methods may be implemented in a "live" system. The methods may be implemented in a manner that is efficient with respect to processing power and storage requirements, and, in embodiments at least, may utilise information that is already available for other purposes, avoiding the need to collect data specifically for the purpose of determining closure information. The invention looks at the presence of devices moving along a given navigable element of the set of navigable elements, i.e. the count of devices, to indicate a closure of another element of the set, rather than trying to infer the closure of an element from an absence of devices moving along that same element. This has been found to result in more accurate determinations of closures.

The present invention extends to a system for carrying out a method in accordance with any of the embodiments of the invention described herein.

In accordance with a further aspect of the invention there is provided a system for detecting the closure of a navigable element forming part of a network of navigable elements within a geographic area, wherein the network of navigable elements comprises a plurality of navigable elements connected by a plurality of nodes, the system comprising:

means for obtaining positional data relating to the movement of a plurality of devices along each one of a set of two or more alternative incoming navigable elements at a node of the network with respect to time;

means for using the positional data to determine a count of devices in a sequence of consecutive devices that have selected a given one of the set of two or more alternative incoming navigable elements from among the incoming navigable elements of the set; and means for comparing the count to a predetermined threshold to determine whether another one of the set of two or more alternative incoming navigable elements at the node is closed.

In accordance with another further aspect of the invention there is provided a system for detecting the closure of a navigable element forming part of a network of navigable elements within a geographic area, wherein the network of navigable elements comprises a plurality of navigable elements connected by a plurality of nodes, the system comprising:

means for obtaining positional data relating to the movement of a plurality of devices along each one of a set of two or more alternative outgoing navigable elements at a node of the network with respect to time;

means for using the positional data to determine a count of devices in a sequence of consecutive devices selecting a given one of the set of two or more alternative outgoing navigable elements from among the outgoing navigable elements of the set; and means for comparing the count to a predetermined threshold to determine whether another one of the set of two or more alternative outgoing navigable elements at the node is closed.

It will be appreciated that, as described in relation to the method, the system may be implemented in conjunction with determining a closure affecting both one of a set of two or more incoming elements, and a closure affecting one of a set of two or more outgoing elements, at the same, or different nodes in the network of navigable elements.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a determined closure, the positional data and/or probability data used to determine the existence of a closure.

The methods of the present invention are, in preferred embodiments, implemented by a server. Thus, in embodiments, the system of the present invention comprises a server comprising the means for carrying out the various steps described, and the method steps described herein are carried out by a server.

The present invention considers positional data relating to the movement of a plurality of devices with respect to time along each of a set of two or more incoming or outgoing alternative navigable elements at a node in order to determine a closure of one of the elements. The incoming or outgoing alternative elements are a set of alternative elements respectively toward or away from the node. Thus, the elements of a set of alternative incoming navigable elements merge at the node, while the elements of a set of alternative outgoing navigable elements diverge from the node. The steps of the method, i.e. obtaining positional data, obtaining the count of devices in a consecutive sequence of devices taking a given element, and comparing the count to a threshold to determine the closure of an element, are carried out by reference to the two or more navigable elements of a set of either outgoing or incoming navigable elements at the node. This is because the navigable elements of a set of either outgoing or incoming navigable elements can be considered alternative navigable elements, in that, if one of the set of elements is closed, devices may travel along another one of the elements toward or away from the node. The method therefore comprises using positional data and count data relating only to outgoing navigable elements when determining a closure of an outgoing navigable element, and using positional data and count data relating only to incoming navigable elements when determining a closure of an incoming navigable element. The set of incoming navigable elements or outgoing navigable elements at a node may or may not include all incoming or outgoing navigable elements at the node.

The node as used herein refers to any point in the network of navigable, e.g. road, elements with a plurality of alternative either incoming or outgoing elements. The node may also comprise one or more of the other of incoming or outgoing navigable elements. The node may be correspond to a decision point of the network of navigable elements. A node may be correspond to any form of junction. For example, a node might be an intersection of a highway, or a point at which an entry or exit slip road meets a highway.

It will be appreciated that the network of navigable elements as referred to herein, and hence the node and the navigable elements of the set of two or more either incoming or outgoing navigable elements, refer to navigable elements of the real world or physical navigable network. The network may be represented electronically by digital map data. The digital map data may be stored by or otherwise accessible by the server, in embodiments in which the method is implemented using a server. Each navigable element of the set of either outgoing or incoming alternative navigable elements may be represented by at least a portion of one or more navigable segments of a digital map, with the node being represented by a node of the digital map. In some embodiments each navigable element of the set of two or more either outgoing or incoming alternative navigable elements is represented by a single navigable segment of a digital map.

A navigable element as referred to herein is an element for a given direction of travel, i.e. toward or away from the node. The determined closure is therefore a closure affecting at least one direction of travel.

In preferred embodiments the set of two or more either outgoing or incoming navigable elements consists of only two outgoing or incoming navigable elements, as appropriate. Thus the method may then be a method of detecting the existence of a closure affecting one of a pair of alternative incoming navigable elements or one of a pair of alternative outgoing navigable elements at a node of the network of navigable elements. The method may involve obtaining positional data relating to the movement of a plurality of devices along each of the pair of outgoing navigable elements, or each of the pair of incoming navigable elements, with respect to time, and using the positional data together with data indicative of a count of a sequence of consecutive devices taking a given one of the pair of outgoing paths, or taking a given one of the pair of incoming paths, together with a predetermined threshold to determine whether the other one of the pair of alternative incoming or outgoing navigable elements is closed.

It will be appreciated that the methods of the present invention may readily be extended to determining a closure affecting one of a set of more than two alternative incoming navigable elements or a set of more than two alternative outgoing navigable elements.

The present invention may be implemented in relation to navigable elements of any type. Preferably the navigable elements are road elements (of a road network). In some embodiments the navigable element(s) are elements of a highway, but it will be appreciated that the techniques are applicable to any type of road element, or indeed other type of navigable element, where appropriate positional data exists or can be determined. Implementation in relation to highway road systems is particularly advantageous, as such data is most likely to already be in existence. For example, first and second alternative incoming navigable elements may respectively be a slip road and a main road of a highway, or vice versa. While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. The present invention is therefore applicable to detecting a closure of any navigable element.

The method involves obtaining and using positional information relating to the movement of devices with respect to time along each one of the set of either two or more alternative incoming navigable elements at the node, or two or more alternative outgoing navigable elements at the node. The positional data is used to determine the count of a consecutive sequence of devices selecting a given one of the set of either outgoing or incoming alternative navigable elements which is used with a threshold in determining whether another one of the corresponding set of elements is closed.

The positional data used in accordance with the invention is positional data relating to the movement of a plurality of devices along each of the alternative navigable elements of a set of two or more incoming navigable elements with respect to time, or of a set of two or more outgoing navigable elements with respect to time. The method may comprise obtaining positional data relating to the movement of a plurality of devices in a geographic region including the node having the set of two or more alternative incoming navigable elements, or the set of two or more outgoing navigable elements, and filtering the positional data to obtain positional data relating to the movement of a plurality of devices along each of the alternative navigable elements of the set of two or more incoming navigable elements, or two or more outgoing navigable elements, at the node with respect to time. This may be done by reference to a known location of the node. The step of obtaining the positional data relating to the movement of devices along each of the set of incoming navigable elements, or the set of outgoing navigable elements, may be carried out by reference to the digital map data indicative of the or each navigable segment representing the navigable elements of the network.

Where an alternative navigable element is represented by a plurality of navigable segments of a digital map, the step of obtaining the positional data relating to the movement of the plurality of devices along the navigable element with respect to time may involve consideration of the origin and destination of paths taken by the devices through the network to allow relevant positional data relating to the travel of devices along the navigable element to be identified.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along an alternative navigable element at a node in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The method of the present invention involves using positional data relating to the movement of a plurality of devices with respect to time along each of the set of two or more alternative outgoing navigable elements, or the set of two or more alternative incoming navigable elements to determine the existence of a closure affecting one of the set of alternative incoming or outgoing navigable elements at the node. The data may be in the form of a respective trace of position against time for each device.

The present invention may provide "live", i.e. short term, detection of closures based on current or near current data. For live positional data, it will be appreciated that the data may be stored shortly before being used, so that it may still be considered to be live data.

The method of the present invention preferably involves obtaining and using "live" positional data relating to the movement of a plurality of devices with respect to time along each of the set of alternative outgoing navigable elements or each of the set of alternative incoming navigable elements in determining a closure of one of the navigable elements. Live data may be thought of as data which is relatively current and provides an indication of relatively current conditions on each alternative navigable element. The live data may typically relate to the conditions on the elements within the last 30 minutes, 15 minutes, 10 minutes or 5 minutes. By using live positional data in determining the closure information, it may be assumed that the information determined is currently applicable, and may be applicable in the future, at least in the shorter term. The use of live positional data allows accurate and up to date closure information to be determined, that can be relied upon by road users and/or navigation devices or ADAS. This is in contrast to systems which rely upon third party data, which may not be up to date. This reduces the risk of a user or system calculating a route to avoid a reported closure which is no longer applicable, and reduces the delay between a closure taking effect and its existence being noted.

In accordance with the invention the method comprises analysing the positional data to determine data indicative of a count of devices in a consecutive sequence of devices selecting a given alternative incoming navigable element of a set of alternative incoming navigable elements, or a given alternative outgoing navigable element of a set of alternative outgoing navigable elements, in favour of any other one of the other ones of the alternative navigable elements of the set. The determined count is used with a threshold to determine whether another one, i.e. other than the element to which the count relates, of the set of alternative outgoing or incoming navigable elements is closed. The method may comprise determining the count by counting the number of devices in a consecutive sequence of devices moving along the given one of the set of alternative incoming or outgoing elements. This may be carried out by reference to the direction of devices entering or leaving the node as appropriate. Thus the method may comprise counting the number of devices in a consecutive sequence of devices entering or leaving the node via the given one of the set of alternative incoming or outgoing navigable elements. The count may be determined by reference to devices entering or leaving the node by the respective navigable elements of the set of incoming or outgoing navigable elements respectively. It is envisaged that once a device is detected in another one of the set of alternative incoming or outgoing navigable elements, the method may comprise initiating a count of devices in a consecutive sequence of devices moving along that navigable element in favour of any other navigable element of the set.

It will be appreciated that when another one of a set of alternative incoming or outgoing navigable elements at a node is closed, the count of devices in a consecutive sequence of devices selecting a given alternative navigable element of the set will typically be higher than would be the case in the absence of the closure. This is due to devices, e.g. vehicles, being forced to divert to the alternative navigable element. Thus, a threshold may be set indicative of a count of devices in the consecutive sequence of devices selecting a given alternative incoming or outgoing alternative navigable element of a set of outgoing navigable elements or incoming navigable elements, that can be considered to be indicative of another one of the alternative navigable elements of the respective set being closed. This may be compared to the situation when tossing a coin. There will be some probability of obtaining a run of "heads" or "tails" of given length. However, as the length of run increases, the probability of obtaining that run will decrease. Similarly, the probability of obtaining a consecutive sequence of devices selecting a particular alternative incoming or outgoing navigable element from the set of possible incoming or outgoing navigable elements will decrease as the count of devices in the sequence increases. Ultimately, if the count exceeds a particular level, it may be assumed that such a count could not be expected to occur in the absence of one of the alternative incoming or outgoing elements of the set no longer being available for use.

In accordance with the invention, the threshold to which the count is compared is a threshold count of devices in the consecutive sequence in the given navigable element that can be taken to be indicative of another one of the navigable elements of the set of navigable elements being closed. The method may comprise determining that another one of the set of outgoing or incoming navigable elements is closed when the count of devices in a consecutive sequence selecting a given navigable element of the set exceeds the threshold.

The method extends to the step of setting the threshold. The threshold is a predetermined threshold, and may be stored by, or otherwise accessible by, a server implementing the methods of the invention.

The number of devices in a count determined for a given navigable element of a set of two or more incoming or a set of two or more outgoing navigable elements to be indicative of a closure of another one of the respective set of navigable elements may be specific to the given navigable element. The threshold is therefore preferably specific to the navigable element in relation to which the count of devices in a consecutive sequence is determined. The threshold number of devices may be set to ensure that the threshold results in a determination of the existence of a closure only when the number of devices in a determined count of a consecutive sequence of devices selecting a given navigable element exceeds a number that might be expected in the absence of the existence of a closure by a statistically significant amount. The method may comprise setting the threshold such that a count of a sequence of consecutive devices selecting the given navigable element is sufficiently (or statistically) unlikely to have occurred in the absence of a closure affecting an alternative one of the set of incoming or outgoing navigable elements to which the given navigable element belongs that an assumption of the closure of another one of the set of alternative navigable elements may be made e.g. to a given level of confidence.

Preferably the threshold is set by reference to the relative probability of the given one of the set of alternative incoming or outgoing navigable elements being selected in favour of any other one of the set of alternative incoming or outgoing navigable elements. Preferably the threshold for a given incoming navigable element is dependent upon the relative probability of the given alternative incoming navigable element being selected by a device from among the set of alternative incoming navigable elements, and similarly for a navigable element that is an outgoing navigable element. The relative probability of the given navigable element being taken refers to the relative probability of the navigable element being taken over and above any of the other elements of the set of alternative elements when each of the navigable elements is open. The relative probability of the navigable element being taken may therefore be referred to as the expected relative probability of the element being selected. The relative probability data can be used to assess when an observed count of devices in a sequence of consecutive devices observed taking a given alternative navigable element rather than any other one of the alternative navigable elements of the set according to the positional data is sufficiently unlikely to occur under normal conditions that the existence of a closure affecting another alternative navigable element of the relevant set of alternative navigable elements can be inferred. In embodiments the threshold is set higher as the relative probability associated with taking the given one of the set of navigable elements increases.

By way of illustration, referring to a situation with a set of two incoming alternative navigable elements at a node, the expected relative probability of a first one of the navigable elements being taken in favour of the second navigable element may be 90%. In another situation, the expected relative probability of the first navigable element being taken may be only 10%. It can be seen that it is more likely, in the absence of any closure affecting the other element, that a sequence of consecutive devices of a given length will be counted selecting the first navigable element in the first case, than in the second. Where a relatively lower probability is associated with taking a given navigable element from the set of navigable elements to which it belongs, it would be unusual to encounter even a relatively short sequence of consecutive devices selecting the navigable element over the alternative navigable element(s) of the set. Thus, where a relatively lower probability is associated with a navigable element being selected from the set of navigable elements, the threshold number of consecutive devices selecting a given one of the navigable elements may be set lower, for the same degree of confidence that the number observed is indicative of the closure of another one of the navigable elements.

The method may comprise storing a threshold for each of the navigable elements of the set of incoming alternative navigable elements at the node and/or the set of outgoing alternative navigable elements at the node, for use in determining whether another one of the relevant set of navigable elements is closed. The threshold may be associated with digital map data indicative of the or each navigable element. Each threshold may be set in accordance with any of the embodiments described herein.

In embodiments in which the threshold is set using relative probability data, the relative probability data may comprise a turning probability for the given navigable element. A turning probability refers to the probability of the navigable element being taken from among the set of alternative incoming or outgoing navigable elements at the node. Typically there will be a most probable navigable element in a given set of either incoming or outgoing navigable elements and one or more alternative navigable elements each having its own lesser relative probability of being taken from among the navigable elements. The data is indicative of an expected relative probability of an incoming or outgoing navigable element being taken, or having being taken, from among the plurality of navigable elements in the set of incoming or outgoing navigable elements as appropriate, and may be any data directly or indirectly indicative of such a probability. For example, the data may comprise a fraction indicative of the proportion of devices that can be expected to take a given incoming or outgoing navigable element relative to the other alternative incoming navigable element or elements of a set of incoming navigable elements, or relative to the other alternative outgoing navigable element or elements of a set of outgoing navigable elements. The relative probability data is preferably pre-existing data.

Preferably the expected relative probability data is indicative of a historical relative probability of the navigable element being taken. The relative probability data is preferably based at least in part, and in embodiments entirely, upon historical positional data relating to the movement of a plurality of devices along each of the alternative navigable elements of the set of incoming or outgoing navigable elements with respect to time. The positional data may be of any of the types described above in relation to the positional data used in the present invention, and may be obtained in accordance with any of the methods described. The positional data is preferably obtained from devices associated with vehicles. Thus the data is preferably historical vehicle probe data.

The data indicative of the relative probability of a navigable element being taken is indicative of an expected relative probability of the navigable element being taken, and references to the "relative probability" data should be understood in this manner unless the context demands otherwise. The relative probability data need not be based, at least entirely, upon historical positional data. The relative probability data may be indicative of a theoretical relative probability of a navigable element being taken, or may be determined empirically in any other suitable manner. The relative probability data may be based at least partially on live data. Thus, in some embodiments the probability data is based upon live and/or historical positional data.

The step of obtaining the relative probability data may comprise collecting positional data and using the positional data to determine data indicative of a historical expected relative probability of the given alternative navigable element being taken. However, preferably the step of obtaining the expected relative probability data comprises accessing the data from a database. Thus, the expected relative probability data is preferably pre-existing stored relative probability data. The database may store relative probability data relating to the likelihood of each of a set of incoming navigable elements, and/or each of a set of outgoing navigable elements being taken at each of a plurality of nodes in the network of navigable elements. The database may be constructed using positional data collected relating to device, e.g. vehicle, movements with respect to time in a geographic region as known in the art. It is envisaged that the relative probability data of the database may be regularly updated based upon collected positional data at suitable time intervals, e.g. every 4 weeks.

The relative probability data used in setting the threshold is preferably indicative of an (expected) relative probability of the given navigable element being taken from among the set of two or more alternative navigable elements in a given time period. The time period is the time period to which the positional data used together with the threshold to detect a closure relates, and may be a time period applicable to the current time. As the present invention, in embodiments at least, involves a comparison of the count of actually observed movements in a given one of the set of alternative navigable elements according to the positional data to a threshold based on the relative probability data for the navigable element to determine the existence of a closure affecting another one of the set of navigable elements, the relative probability data should reflect the relative probability of the element being taken that can be expected to be applicable at the time to which the positional data relates. In this way, the relative probability data can be used to set a level of the threshold appropriate under the traffic conditions and patterns that might be expected at the time to which the positional data relates, allowing it to be determined whether a statistically significant difference exists with respect to the expected longest count of consecutive devices selecting the given alternative navigable element. The time period may be a period of the day and/or day of the week.

The threshold used in accordance with the invention to determine whether a count of devices selecting a given navigable element of a set of navigable elements is preferably a threshold in respect of a time period to which the positional data, e.g. count, relates. Where the data is live data, the time period is preferably a current time period. In embodiments the method comprises storing data indicative of a threshold for use in determining whether a count of a consecutive sequence of devices selecting a given one of a set of outgoing or incoming navigable elements is indicative of the closure of another one of the elements for each of a plurality of different time periods, preferably wherein the threshold is based upon data indicative of the relative probability of the given navigable element being taken from that period. The method may comprise selecting the threshold for a time period applicable to a time to which the positional data relates from the database, and using the threshold with count data determine using the positional data in determining whether a closure exists.

The threshold data and/or relative probability data is preferably associated with digital map data indicative of the node with which the set of alternative incoming or outgoing navigable elements is associated.

In accordance with the invention in any of its aspects or embodiments, the threshold number of devices may be set so as to provide a given level of confidence in the assumption that a closure exists affecting an alternative navigable element of the set. For example, for a given relative probability associated with taking a given alternative navigable element of a set of navigable elements, setting the threshold to a higher value will naturally result in a greater level of confidence in the assumption. In other words, while it may be possible to assume a closure situation when a given number of devices selecting the navigable element are observed in a sequence, as the number of devices increases, the probability of that length of sequence being observed under "normal" conditions diminishes, increasing confidence in the conclusion that a closure exists.

Where a set of navigable elements includes more than two outgoing navigable elements, or more than two incoming navigable elements, if a comparison of the count to a threshold in respect of one of the given elements results in a determination that another of the elements is not closed, the method may be repeated, this time determining a count in respect of another given one of the set of navigable elements, to determine whether another one of the elements is closed.

It has been realised that sometimes false positive determinations of closures affecting navigable elements may be made. This is because, while an absence of devices, e.g. vehicles, travelling along a particular navigable element may be due to the closure of the navigable element, other factors may also result in an absence of devices, e.g. vehicles, moving along a navigable element. Such factors may include map errors. If the digital map data is incorrect or out of date, the course of the navigable segment(s) representing the navigable element may not be correct. This may be due simply due to an error in the digital map, or due to a temporary repositioning of a navigable element, e.g. due to road works, or a permanent closure of the element in favour of a new element. Thus, it may be determined that no devices are travelling along a navigable element represented by one or more navigable segments having a course according to the map data, when in fact the navigable element has been repositioned or the map data never correctly reflected the position of the navigable element in reality, and there are devices moving along the navigable element. In the embodiments described herein, such a situation may lead to a determination that a sequence of consecutive devices has passed along a navigable element of a length exceeding a threshold for closure determination, when in fact the actual length of the sequence is significantly shorter as vehicles have been travelling along another one of the set of navigable elements as well, but have failed to be noted as the map data does not accurately reflect the course of the other navigable element.

In preferred embodiments the method further comprises carrying out a validation step if the existence of a closure is determined based on the threshold. This is particularly useful in enhancing the accuracy of the determination of closure information in the context of the preferred, live system, implementations of the present invention.

In accordance with the invention in any of its aspects or embodiments, the method preferably comprises attempting to match the positional data received from each of the plurality of devices to a position on a segment of one of a plurality of navigable segments of a digital map representing the network of navigable elements. This process may be referred to as "map matching", and may involve the use of various algorithms as known in the art. The method may comprise attempting to match each item of positional data to a position along one of the navigable segments of the digital map. In carrying out this map matching process, a map matching error indicative of a difference between a position indicated by the positional data, and the position on the navigable segment to which it is matched, may be derived in respect of each item of positional data. In embodiments, for each of the plurality of devices, the method may comprise attempting to match each positional data point to a position on a navigable segment of the digital map. A map matching error may be determined for each data point. Such a map matching error may arise for various reasons, such as, for example, general noise in the positional data signals and/or mapping errors, e.g. where a reference line of a navigable element is not correctly geo-referenced in the map such that the position of the navigable element represented by a segment of the electronic map does not precisely correspond to the actual position of the element in reality. Where a difference between a position indicated by the positional data and the closest position along a navigable segment of the map exceeds a given threshold, it may be determined that the position of the device cannot be matched to a navigable segment of the digital map. This may be the case where, for example, the course of a navigable element in reality has changed from that recorded in the digital map data.

In embodiments the one or more navigable elements of the set of two or more alternative incoming or outgoing navigable elements are each represented by one or more navigable segments in a geographical region covered by a digital map, and the method further comprises defining a geographical area covered by the map containing the or each navigable segment representing the navigable element determined to be affected by a closure, and comparing a number of devices whose positions can be matched to a navigable segment of the digital map data throughout movement through the geographical area to a number of devices whose positions cannot be matched to a navigable segment of the digital map within the geographical area throughout movement through the geographical area, and using the results of the comparison to determine validate a determined closure. Thus the devices are devices whose positions can or cannot be continuously matched to a navigable segment of the digital map within the geographical area throughout movement through the area. In embodiments, the position of a device may be matched to a navigable segment when the position is within a predetermined distance of a position along the navigable segment. The distance may be set as known in the art to take into account inherent errors in the positional data signals, etc, thereby allowing for a given degree of error in the map matching process.

It is believed that the steps of determining a number of devices whose positions cannot be matched to a navigable segment of a digital map throughout travel through a geographic area, and comparing this number to a number of devices whose positions can be so matched, is advantageous in validating a suspected closure affecting a navigable element represented by one or more navigable segments in the geographic area however that suspected closure is determined, whether or not it is determined using the methods in accordance with the earlier aspects of the invention, and indeed, is more generally applicable to validating other attributes, such as changes in geometry, etc, associated with navigable elements of a network of navigable elements represented by one or more navigable segments of a digital map.

Thus, in accordance with a further aspect of the invention, there is provided a method of validating a determined attribute associated with a navigable element forming part of a network of navigable elements within a geographic region, wherein the network of navigable elements comprises a plurality of navigable elements connected by a plurality of nodes, and wherein each navigable element is represented by one or more navigable segments of a digital map covering the geographical region, the method comprising the steps of:

defining a geographical area in the region covered by a digital map, the geographic area containing one or more navigable segments representing a navigable element having an attribute associated therewith to be validated;

obtaining positional data relating to the movement of a plurality of devices with respect to time within the geographical area;

comparing a number of devices whose positions can be matched to a navigable segment of the digital map throughout movement through the geographical area to a number of devices whose positions cannot be matched to a navigable segment of the digital map within the geographical area throughout movement through the geographical area; and using the results of the comparison to validate the attribute associated with the navigable element.

In accordance with a further aspect of the invention there is provided a system of validating an attribute of a navigable element forming part of a network of navigable elements within a geographic region, wherein the network of navigable elements comprises a plurality of navigable elements connected by a plurality of nodes, wherein each navigable element is represented by one or more navigable segments of a digital map covering the geographical region, the system comprising;

means for defining a geographical area in the region covered by a digital map, the geographic area containing one or more navigable segments representing a navigable element having an attribute associated therewith to be validated;

means for obtaining positional data relating to the movement of a plurality of devices with respect to time within the geographical area;

means for comparing a number of devices whose positions can be matched to a navigable segment of the digital map throughout movement through the geographical area to a number of devices whose positions cannot be matched to a navigable segment of the digital map within the geographical area throughout movement through the geographical area; and means for using the results of the comparison to validate the attribute associated with the navigable element.

In some embodiments the attribute is indicative of a closure of the element. The closure may have been determined using any technique, and not necessarily the techniques of the present invention. Alternative the attribute may be any other attribute of the element, e.g. indicative of a change in geometry of the element, etc.

The present invention in these further aspects may be implemented by a server. The server may be arranged to store the digital map data and to carry out the steps defined.

The present invention in these further aspects may include any or all of the features described in relation to the earlier aspects of the invention, and vice versa, to the extent that they are not mutually inconsistent. If not explicitly stated herein, the system may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

In accordance with the invention in these further aspects and embodiments involving comparison of a number of devices whose positions can and cannot be matched to navigable segments in a geographic area, the number of devices whose positions cannot be matched to a navigable segment of the digital map within the geographical area may be determined by determining a number of devices whose positions could initially be matched to a position along a navigable segment of the digital map and which could not be matched to a subsequent navigable segment or portion of the navigable segment. In other words, the devices are devices which appear to be "lost" to the system.

The method in these further aspects and embodiments may comprise determining that the determined closure or other attribute associated with a navigable element is not valid when the ratio of the number of devices whose positions cannot be matched to a segment of the digital map throughout travel through the geographic area to a number of devices whose positions can be matched to a segment of the digital map throughout travel through the geographic region exceeds a predetermined threshold. The method may comprise validating the determined attribute e.g. closure unless the ratio of the number of devices whose positions cannot be matched to a segment of the digital map throughout travel through the geographic area to a number of devices whose positions can be matched to a segment of the digital map throughout travel through the geographic area exceeds a predetermined threshold. The threshold may be set as desired depending upon the level of confidence required that the e.g. closure exists, rather than an error in the digital map data. Alternatively or additionally the method may comprise validating the attribute or closure when the ratio of the number of devices whose positions cannot be matched to a segment of the digital map throughout travel through the geographic area to a number of devices whose positions can be matched to a segment of the digital map throughout travel through the geographic region is below a predetermined threshold.

The geographical area could be defined in any suitable and desired manner. For example, the area could be a circle centred at a location associated with the navigable element associated with a closure or other attribute to be validated, and having a predetermined radius. The location may be any suitable reference location along the navigable element. The radius may be a distance of 1000 meters, for example. The area could be defined the same way for any navigable element having an attribute, e.g. closure, to be validated, or alternatively the geographical area may be defined in dependence on the navigable element, e.g. a location of the element. In these embodiments, setting the geographic area to be larger in size will result in potential attributes or closures being discarded when there is a problem with the digital map at a greater distance from the potentially affected element(s), while setting the geographic area to be smaller in size will result in potential attributes or closures being validated unless there is a more local problem with the map.

In accordance with the invention in any of its aspects or embodiments involving the determination of a closure of a navigable element, once a determination has been made that a closure exists affecting navigable element, and, in preferred embodiments, validated, the information may be used in various manners. In some embodiments the method further comprises associating data indicative of the existence of the (preferably validated) closure with the or each navigable segment representing the navigable element affected in a digital map. The data may be in the form of an attribute associated with the or each element. The method may comprise storing data indicative of the existence of the (preferably validated) closure, preferably in association with data indicative of the or each navigable segment representing the navigable element. The method may comprise using the determined data indicative of a closure in calculating a route and/or in providing traffic information, e.g. to devices associated with vehicles. The method may comprise providing information indicative of the determined (preferably validated) closure to a third party provider, e.g. a traffic information provider.

Where an attribute is validated, the validated attribute may be used to update the digital map data. For example, the attribute might be a change in course of a navigable element. The validated attribute may be used to update the navigable segment or segments representing the navigable element in the digital map data.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

It should be noted that the phrase "associated therewith" in relation to one or more segments should not be interpreted to require any particular restriction on data storage locations. The phrase only requires that the features are identifiably related to an element. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining the closure of a road element of a network of road elements. Accurate determination of the existence of road closures is important in a navigation system. A road closure will have an impact on possible routes between an origin and a destination, necessitating alternative routes around the closed element to be used. In practice, the existence of a road closure has an effect on the road network comparable to a traffic jam of infinite severity. Whether or not a route is pre-calculated, it is important to users of a navigation system to be informed of road closures so that they can take a different route if needed. The present invention provides a method for more reliably, and automatically, detecting closures.

Figure 1:
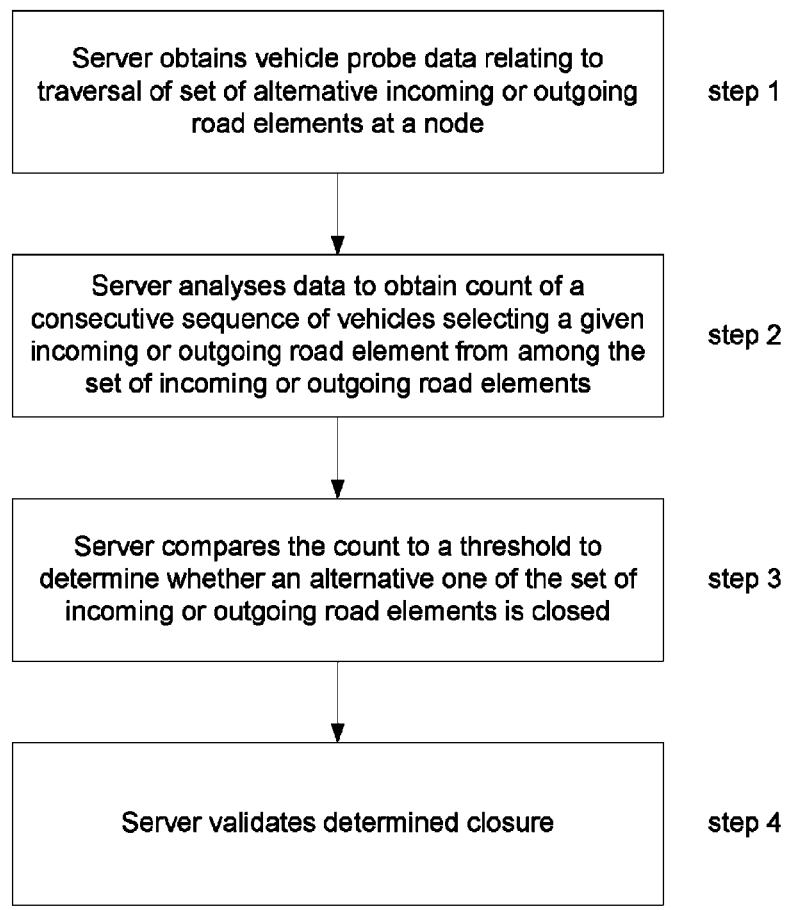
FIG. 1 is a flow chart illustrating the steps of a method in accordance with one embodiment of the invention.

A preferred embodiment of the invention will be described by reference to the flow chart of FIG. 1. The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data. The probe data can be used to derive probe traces relating to travel of probe vehicles in a geographic region which includes the traffic control signal of interest.

Figure 2A:
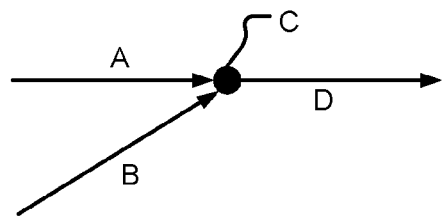
FIG. 2A illustrates a node with two alternative incoming road elements.
Figure 2B:
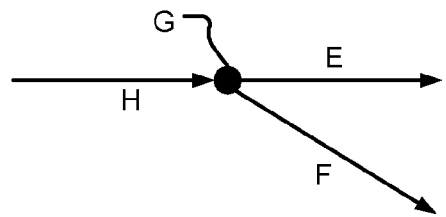
FIG. 2B illustrates a node with two alternative outgoing road elements.

Step 1 of the method in accordance with the embodiment illustrated in FIG. 1 comprises a server using live probe data to identify probe traces associated with vehicles which are travelling along each of a pair of incoming road elements, or each of a pair of outgoing road elements, at a junction. The incoming or outgoing road elements of the pair may be considered to be "alternative" road elements, such that a vehicle may be expected to use the other road element if one is closed. FIG. 2A illustrates alternative road elements A and B which are incoming to a junction C. An outgoing road element D at the junction is also illustrated. FIG. 2B illustrates alternative road elements E and F which are outgoing from a junction G, and also illustrates an incoming element H. The road elements of a pair of incoming or outgoing road elements may be a main road and an entry slip road, for example.

The road elements and the junction are represented by respective road segments and a node of a digital map data stored by a server. While the method is illustrated by reference to alternative road elements which are each represented by a single road segment of a digital map, the method may be implemented in relation to road elements that are represented by a portion of one or more road segments of a digital map.

The alternative road elements and node that are considered may be selected as desired from the road network. The server may be arranged to identify a list of junctions and associated sets of two or more alternative incoming or two or more alternative outgoing road elements in relation to which the steps of the method are to be carried out to detect whether one of the alternative road elements of the respective set is closed. While, for ease of reference, the present invention is exemplified with respect to sets of two alternative incoming or two alternative outgoing road elements at a junction, generalisation to sets of more than two alternative incoming or more than two alternative outgoing road elements at a junction is of course possible.

Referring, by way of illustration to the situation shown in FIG. 2B, in which a pair of outgoing road elements E and F is associated with the junction G, in step 2, the server analyses the vehicle probe data relating to the travel of vehicles along each of the road elements E and F to determine a count of vehicles in a consecutive sequence of vehicles selecting outgoing road element E rather than outgoing road element F when leaving the junction. This is done by counting a first vehicle taking road element E, and incrementing the count every time another vehicle takes this road element, until a vehicle is detected to have taken road element F instead. In this step, the number of vehicles in a sequence taking only one of only a pair of alternative outgoing road elements is counted. The count may be determined by using the live vehicle probe data, and identifying devices found to have taken the road segment or segments corresponding to the relevant road element E and F at the node representing the junction in digital map data. In other words, the probe data may be "map matched". Where there are more than two outgoing alternative road elements at the junction, it may be necessary to keep track of the origin and destination of vehicles using the probe traces to obtain a suitable count of vehicles selecting one road element over each of the others.

In step 3, the server compares the count of vehicles taking the road element E to a threshold to determine whether road element F can be assumed to be closed. If the count exceeds the threshold, the road element F is deemed closed, optionally pending validation of the closure. The threshold is a predetermined threshold that is specific to the road element E. In other words, the threshold is one that has been determined to be appropriate for determining whether the other element is closed using a count of consecutive vehicles found to be on element E. The threshold may be in respect of the current time period. The threshold is dependent upon the relative probability that road element E is taken out of the two road elements E and F. The higher the relative probability of the road element being taken, the higher the threshold. The setting of the threshold is described in more detail below. Briefly, the threshold is indicative of a count of a value so high that it can be deemed to be statistically unlikely to occur under normal conditions, i.e. with elements E and F being open, that it can be assumed, with a desired degree of confidence, that the road element F must be closed.

Referring, by way of illustration to the situation shown in FIG. 2B, in which a pair of outgoing road elements E and F is associated with the junction G, where E is a main road, and F is an exit slip road, the relative probabilities of a vehicle taking either of these outgoing elements at the node might be 90% and 10% respectively. If E is the exit slip road, and F the main road, the relative probabilities would be reversed. Thus, if E is a main road, with a relatively high probability of being taken, the threshold used in determining whether the count is indicative of the closure of F will be set higher than if E is a slip road. This reflects the fact that it would be more usual to obtain higher counts of consecutive vehicles taking a main road than a slip road, such that a higher count of consecutive vehicles in a main road would be needed to trigger a finding that the alternative road is closed than would be the case if the count related to a slip road, with lower probability of being taken.

Such relative probability data is determined empirically by analysis of historical vehicle probe data relating to movements of vehicles across the junction. The data may be updated periodically, e.g. every 4 weeks, using positional data collected over the period since the last update. Thus, live positional data may be stored for subsequent use in updating relative probability data for the junction. Data of this type may be known for different junctions of the road network, avoiding the need to specifically collect data for the purposes of the invention. A database of turning fractions for each junction of the network may exist, which is accessed by, or stored by the server to obtain the relevant relative probability data.

The same process would be used where incoming road elements are considered. For example, by reference to FIG. 2A, a count of the number of vehicles arriving at the junction along road element A rather than road element B may be determined using the probe data in a similar manner. The count may then be compared to a threshold for road element A to determine whether the count can be taken to be indicative of road element B being closed.

In optional, but preferred, step 4, the server validates the finding of the closure of the road element, i.e. road element F in this example. In order to do this, the server defines a geographical area of predetermined radius in the digital map representing the network of navigable elements, and centred on the road segment of the map representing road element F. The radius defining the region might be 1000 m, for example.

In determining the count of vehicles taking element E, the server carries out map matching of the vehicle probe data to the road segments of the digital map. As known in the art, this involves attempting to match each received position from a device to a position along a road segment of the map. Where a received position does not correspond to a position along such a segment, it may be possible to match the position to the segment, where the position differed from the position of the segment by less than a threshold deemed allowable for the position to be matched to the segment, with an appropriate map matching error indicative of the difference between the observed position according to the data, and the position on the map to which it has been matched. In some cases, however, it is not possible to match a received position to a position along a road segment of the digital map, at least within an allowable map matching error for the system. This may be the case where the course of the real life road element differs substantially from that of the road segment of the digital map intended to represent it, e.g. due to a change in course of the road element that is not reflected in the map data or simply an error in the map data.

In performing the validation step, the server determines a number of vehicles whose position could not be matched continuously to a road segment of the digital map during travel across the predefined region, and a number of vehicles whose position could be matched continuously to a road segment of the digital map during travel across the predefined region. Where the ratio of the number of devices whose position could not be matched to those whose position could be matched exceeds a predetermined threshold, it is determined that the closure cannot be validated. This is because the inability to map match the position of a significant number of devices to segments of the digital map in a region including the potentially closed element suggests that there may be a problem with the map data in this region. Where the map data is inaccurate, it is possible that the road segment intended to represent road element F does not accurately reflect the course of the real-life road element. This would mean that movements of vehicles along road element F may not have been matched to the road segment representing element F, and therefore may not have been noted when determining the count of consecutive vehicles selecting road element E. Thus, the determined count of consecutive vehicles selecting element E may have been higher than was, in reality the case, leading to the incorrect triggering of the threshold for determining a closure of element F, i.e. a "false positive" result.

Figure 3:
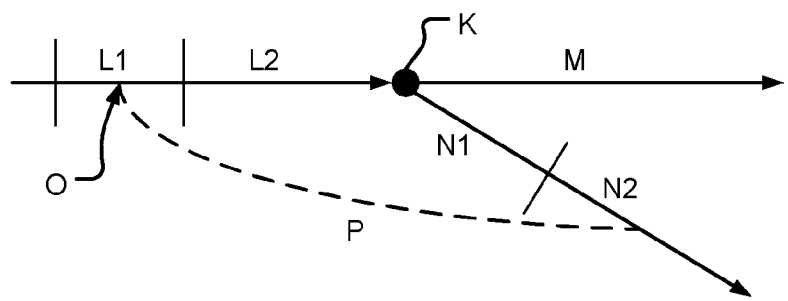
FIG. 3 illustrates road segments of a digital map in the region of a node, including a road element that has changed course compared to the road segment intended to represent the element as indicated in dotted lines.

This validation method is illustrated by reference to FIG. 3. FIG. 3 represents a portion of a predefined area represented by a digital map. The portion of the area shown in FIG. 3 includes a node K, having an incoming road segment L2 (which is connected to road segment L1), and two outgoing road segments M and N1. The road segment N1 is connected to road segment N2. The server attempts to match positions of vehicles according to received probe data to the road segments of the digital map illustrated in FIG. 2. In this example, the positions of devices travelling along a road element represented by segment L1 are initially matched to the segment. However, after point O, it is no longer possible to match the positions to the road segment L1 as they travel toward the node K. This is because road segment L1 no longer accurately represents the trajectory of the road element in the real world that it is intended to represent at this point, as the road element now follows the path P illustrated in dotted lines in FIG. 3, and not the course of the road segments L1 and L2 which continue to the node K. The probe traces relating to vehicles travelling along road segment L1 therefore become "lost" at this point, as they can no longer be matched to the digital map as they traverse the region. The server compares the number of such "lost" probe vehicles in the entire predefined area to those whose position can be matched to the digital map throughout travel through the area. The number of "lost" devices exceeds a threshold, resulting in invalidation of the suspected closure in the area, as it can be assumed that a map error exists in the region, which will have made the closure determination unreliable.

Figure 4:
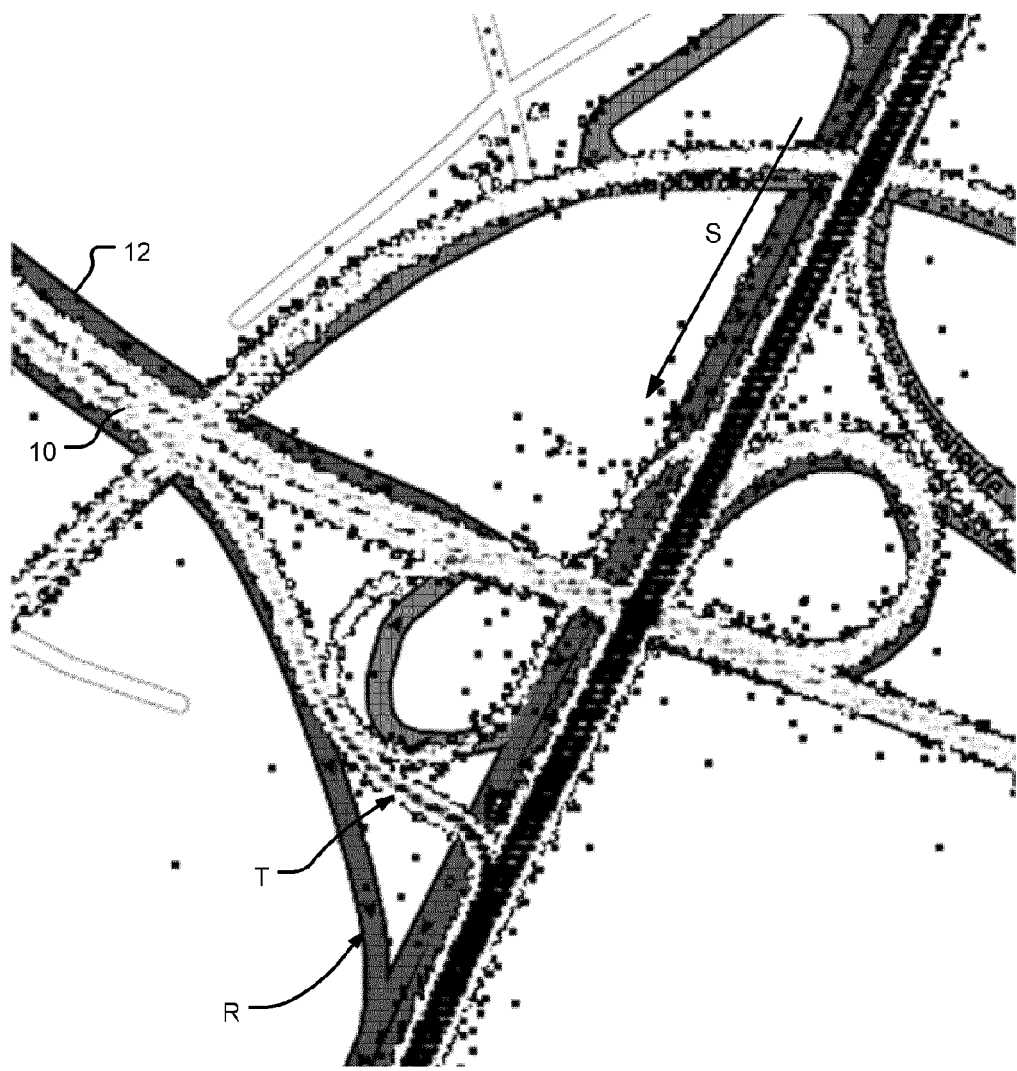
FIG. 4 illustrates an example of how GPS probe data may be matched to a digital map in the region of a temporary change to the road element layout.

FIG. 4 illustrates another example of a situation in which probe data matched to a digital map in the region of a junction may lead to false positive determinations of a closure of a road element at the junction if the additional validation step of the invention is not performed. Here dots indicative of GPS "fixes" recorded by probe vehicles 10 are superimposed over a representation of the road network 12 (derived from digital map data) to form a density map. While the positions of devices travelling along the main road have been successfully map matched, the probe data indicates that the "on-ramp" road element R travelling in the direction of the arrow, and assuming right hand travel, is closed, as there are no probe traces on it. If the method for detecting a closure were implemented for the pair of road elements R and S, S being the road element corresponding to the main road carriageway in the direction of the arrow, it would be found that no devices were present on road element R, and an infinitely long count of devices on path S. This would lead to a determination that road element R is closed. However, in reality, the path of the "on-ramp" has been repositioned temporarily to path T, which does have devices travelling along it according to the probe data. Thus the road element S is not closed, but merely repositioned, and the problem is that the map data does not reflect this. By carrying out the validation method described, the potential closure of element S would be discarded given the uncertainty surrounding the map data for this region. The validation method would identify a significant number of "lost traces" approaching road element R, and then "disappearing".

This method, involving comparison of the number of devices traversing a predefined geographic region covered by a digital map whose positions can be "map matched" throughout travel across the region to those whose position cannot be so "map matched" is advantageous in its own right, and can be used to validate potential road closures identified using any technique, not just those described by reference to FIG. 1. The technique may be used in general to validate any desired attribute, not just a closure of a navigable element, by reference to the number of devices whose positions can, and cannot, be map matched during traversal of a predefined geographic region chosen to include the navigable segment or segments of a digital map representing the navigable element. For example, the attribute might be a detected deviation of the road element from the course of the road segment representing the segment in the digital map.

Returning to FIG. 1, once a closure has been determined, and preferably validated, the server may update the digital map data to reflect the existence of a closure associated with the road segment representing road element F. The closure data may be provided to third parties for distribution, e.g. in traffic reports, or may be provided to navigation devices associated with vehicles or otherwise, e.g. for use in route planning. The server may store data indicative of the closure in association with the road segment data for segment F, e.g. as an attribute thereof.

It has been found that the determinations of road closures obtainable in accordance with the invention are more reliable than prior art determinations, as they are based upon detecting a positive count of vehicles moving along a given one of a set of alternative incoming or outgoing road elements at a node, rather than being inferred from an absence of vehicles detected along a given road element, or a reduction in comparison to a "usual" number. This is because the number of probe vehicles moving along a road element is highly time dependent, e.g. between day and night, but also between working days and days during the weekend or bank holidays. It is therefore difficult to detect a "change" over time in the traffic pattern of a road element by comparison to an "expected" level of traffic, as it is hard to define what that expected level might be. Furthermore, when attempting to detect the absence of vehicles, it is necessary to define a time period in which no vehicles must be detected for it to be assumed that the element is closed. For some road elements, an absence of vehicles for some hours may not be indicative of a closure. By referring to the presence of vehicles instead, the present invention allows closure determinations to be made more quickly, and in a predictable time frame, making it suited to live implementations.

The way in which the threshold for determining whether a count of vehicles taking one road element of a set of alternative incoming or outgoing elements is indicative of the closure of another one of the road elements may be set, will now be discussed in more detail.

For a node, e.g. junction, with a set of n alternative outgoing road elements, or a set of n alternative outgoing road elements, the relative probability of a given one of the road elements being taken out of the set of elements $p_i$, where i=1, . . . M, and where M is the number of road elements in the set, is measured by counting the probe vehicles $n_i$ that are traversing the road elements i by:

$$p_i = \frac{n_i}{\sum_{i=1}^{M} n_i} \qquad \text{Eqn. 1}$$

The determined relative probabilities $p_i$ could also be referred to as turning fractions. The relative probabilities will have values within the range [0, 1]. For a reliable estimation of the relative probability of a given road element being taken, a sufficiently large number of traces (sample size) should be used.

The relative probability data, e.g. turning fraction data, used in setting a threshold to assess whether a count of a sequence of consecutive vehicles observed on the road element is indicative of the closure of another one of the set of elements is preferably in respect of a given time period applicable to the current time. This may be achieved by storing relative probability data in respect of a plurality of different time periods, e.g. morning peak, afternoon peak, weekday, weekend or even for 1 hour timeslots on each day of the week. The server will then access the data applicable to the current time. In this example the data selected is relevant to a current time as this is a "live" system implementation.

As described above, the closure probability of a given road element of a set of incoming or outgoing road elements increases with an increasing sequence count on another one of the road elements. In accordance with the invention a threshold is set, whereby any count longer than the threshold observed in a given road element of a set of incoming or outgoing alternative road elements at a node can be taken to be indicative of the closure of another road element in the set of elements.

The threshold used in the invention is set taking into account a desired degree of confidence in the determination of a closure, and the relative probability that the road element to which the count relates is taken from the set of alternative incoming or outgoing elements. Over a given sample size of observations, there will be a distribution in the length of sequence counts obtained.

Gumbel statistical methods may be used to determine a suitable threshold which provides a desired closure probability based upon a cumulative distribution for the lengths of sequence counts obtained for a given sample size. By consideration of the statistics it is possible to determine a length of sequence which can be used as a threshold, being sufficiently long that it could not reasonably be expected to have arisen, taking into account the relative probability of the road element being taken, and the desired level of confidence required, other than as a result of an alternative path being closed.

The level of the threshold is determined such that a count exceeding the threshold in a given road element of a set of incoming or outgoing road elements will correlate to a given closure probability of an alternative road element of the set.

The closure probability of an alternative road element based on an observed sequence count x in the road element subjected to the sequence count can be calculated from the Gumbel statistics taking into account the relative probability $p_i$. The cumulative distribution function $P(X \le x)$ refers to the probability that a random variable X with a given probability distribution will be found at a value less than or equal to x.

The formula for the cumulative distribution function is:

$$P(X<x;p,N) = \exp(-p^{\tilde{x}+1}) \quad \text{Eqn. 2}$$

wherein:

$$\tilde{x} = x - x_{shift}(p,N) \quad \text{Eqn. 3}$$

and $$x_{shift}(p,N) = -\frac{\ln N + \ln(1-p)}{\ln p} \quad \text{Eqn. 4}$$

Equation 2 can be referred to as the "quantile function", specifying for a given probability p the value x which the random variable X will be at, or below, with that probability.

The alternative road segment is detected to be "closed" if the observed sequence of vehicles in the road segment subjected to the count exceeds a threshold value $x_{threshold}$ depending on the desired closure probability level $P=P_{closed}$, i.e. the desired level of certainty in the determination that the segment is closed. The threshold value $x_{threshold}$ for observing a sufficiently large sequence is calculated based on the relative probability $p_i$, i.e. turning fraction, using the inverse relation of Equation 2:

$$x_{threshold}(P_{closed}; p, N) = \frac{\ln(-\ln P_{closed})}{\ln p} - 1 + x_{shift}(p,N) \quad \text{Eqn. 5}$$

Equation 5 allows one to determine directly the number of vehicles that must be counted in the sequence on one road element to be able to conclude that the alternative road element is closed for a given probability threshold $P_{closed}$. $P_{closed}$ could, for example, be set at 99% for a robust confidence level in a real-world application. If the count of probe vehicles observed in a sequence in the road segment exceeds this threshold value, then the road element is detected as "closed". The main input variable for this threshold value, in addition to the observed sequence count in the live system, is the relative probability or turning fraction associated with the road element.

FIGS. 5A-D are plots of the cumulated distribution function as calculated according to Equation 2 against sequence count x in the road element being considered for different relative probabilities, i.e. turning probabilities being associated with the alternative road element whose closure is being determined. FIGS. 5A-D are by reference to the case in which two road elements are considered; that whose closure is determined, and that which is subjected to the count. FIGS. 5A-D are plots for turning probability of 0.01, 0.1, 0.2 and 0.9 respectively for the road element tested for closure ("elementary turning probability"). Thus these plots would reflect the case where the road element is a minor road (0.01) or a main road (0.9) and cases in between. Of course, as there are only two road elements, the turning probability for the road element subjected to the count will simply be derived from these values. In these plots, the horizontal axis is the random variable being the length of the sequence count observed in the element subjected to the count, and here referred to as "the other alternative".

It will be seen that the relevant plot, taking into account the turning probability associated with the road element subjected to the count, can be used to determine a threshold which is a length of the sequence count which needs to be observed in the element subjected to the count in order to be able to infer that the other road element is closed to a desired level of certainty (as indicated by selecting a suitable value along the vertical axis relating to cumulative distribution function).

It can be seen from FIGS. 5A-D that one needs a longer observed sequence count in a main road, i.e. a road having a higher relative probability value associated with it, to detect a closed slip road, and a shorter sequence count in a lesser probability slip road to detect a closed main road.

Referring to Equations 2 to 4, it will be seen that the formula for the distribution function depends on the parameter N which is the total number of all observations (sample size). For an infinite N (N→∞), the longest runs of sequence observations will diverge. This behaviour can be seen in FIGS. 5A-D which plot the cumulated distribution function against the number of observations required in the alternative road element to arrive at a given value of the cumulated distribution function for different values of sample size N. It may be seen that the cumulative distribution function is shifted to the right (to larger values) for increasing N. However, this shift is only logarithmic and therefore weak. For real-world applications it is sufficient to set this parameter to a sufficiently large value (e.g. N=$10^6$) reflecting the assumption that the particular observation is based on a very large sample of probe vehicle counts on a road element.

Referring to FIGS. 5A-D, let us consider an example of a slip road and a main road with assumed turning fraction of p=0.1 for the slip road and p=0.9 for the main road.

Figure 5A:
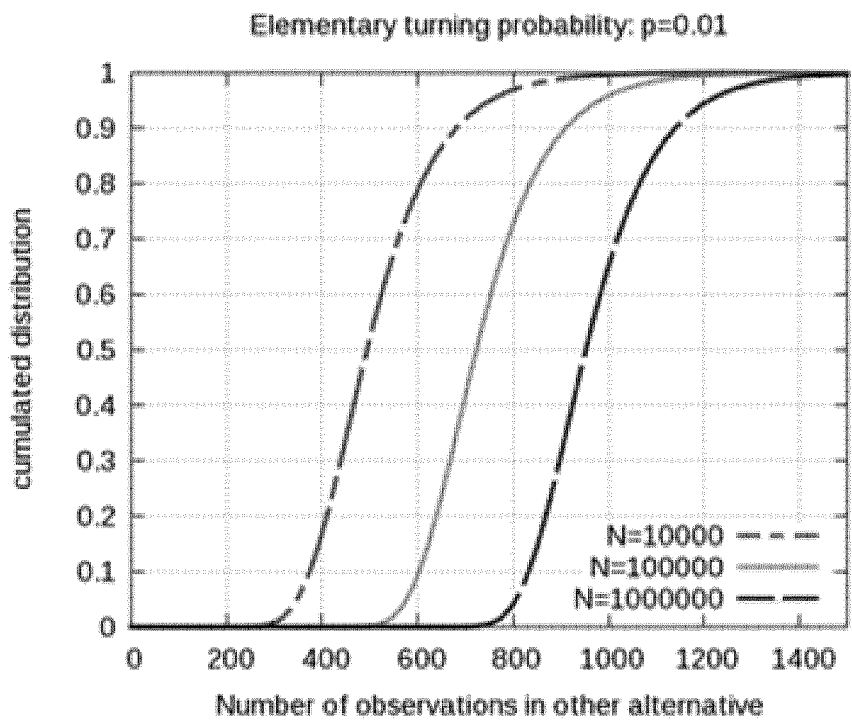
FIGS. 5A-D are plots of cumulative distribution functions that can be used to describe longest run observations according to Gumbel statistics.
Figure 5B:
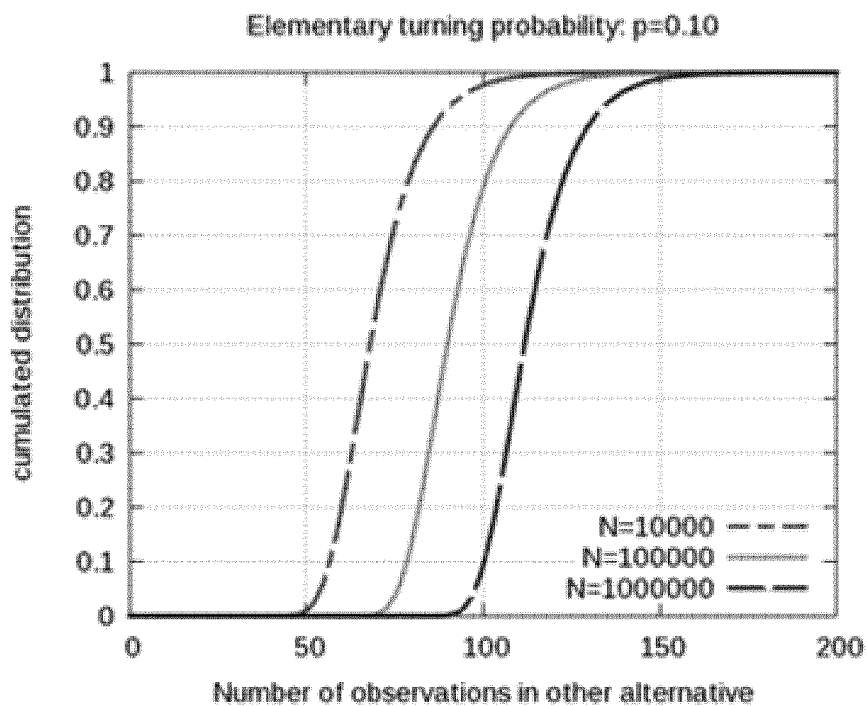
Figure 5C:
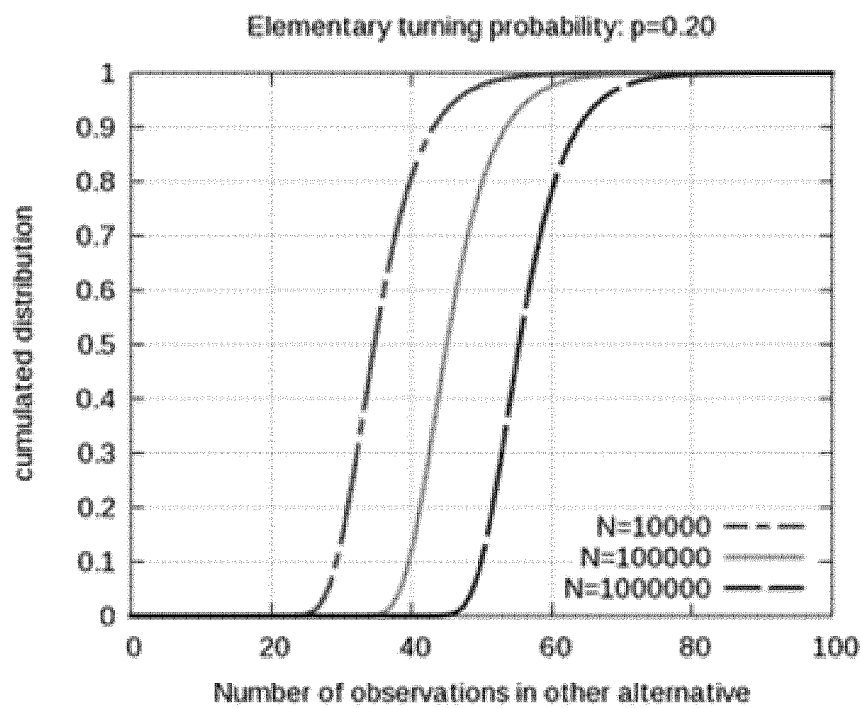
Figure 5D:
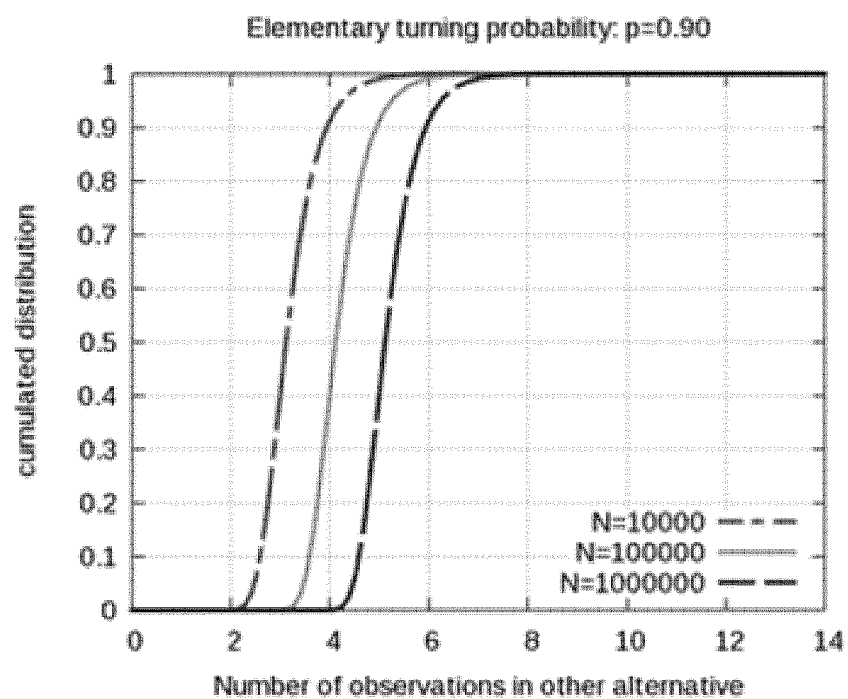

In order to determine that the main road is closed with a "closure probability" of for example $P_{closed}$=90%, the FIG. 5D shows that a sequence count of around 5 vehicles will be adequate in the slip road, as this length of count would only be observed in the final 10% of the distribution of sequences for the relevant sample size N. In other words it is only 10% likely that this length of count would be observed normally, in the absence of a closure affecting the alternative road segment, such that the closure probability is 90%.

Conversely, where one wishes to detect the closure of the slip road, and looking at FIG. 5B, one needs about 100 consecutive observations in the count along the main road. The exact values from FIG. 5B are 86, 108 and 130 for the different values of N.

These threshold values are shifted to higher values if one is interested in determining the presence of a closure to a 99% probability level, such that only the last 1% of sequences observed for the given sample size will naturally be above the threshold length in the absence of a closure.

While the above description relates to using the Gumbel (or "longest run") distribution, which describes the probability of the maximum that one observes a series of N events in a row given an elementary probability p for a single event, it is possible to use other distributions to determine the threshold value. One such alternate distribution is the geometric distribution, which describes the probability that the first occurrence of success requires a number x of independent trials, each with success probability p. In the present application, the "trial" is the observation that a probe vehicle is not traversing a given road, but instead taking an alternate link, and the "success probability" is the turning fraction for the node in question. The cumulative distribution function and quartile functions for the geometric distribution are as follows:

$$P(X < x; p) = 1 - (1-p)^x \qquad \text{Eqn. 6}$$

$$x_{threshold}(P_{closed}; p) = \frac{\ln(1 - P_{closed})}{\ln(1 - p)} \qquad \text{Eqn. 7}$$

By comparing Equations 2 and 5 for the Gumbel distribution with Equations 6 and 7 for the geometric distribution, it can be seen that the geometric distribution is not dependent on the sample size, and so can be a simpler choice when implementing the described method. The Gumbel distribution is, however, a more conservative estimate and is more likely to lead to a lower "false positive" result in practice.

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of detecting the closure of a navigable element forming part of a network of navigable elements within a geographic area, wherein the network of navigable elements comprises a plurality of navigable elements connected by a plurality of nodes, the method comprising:
    obtaining positional data relating to the movement of a plurality of navigation or driver assistance devices from the plurality of navigation or driver assistance devices along each one of a set of two or more alternative incoming navigable elements at a node of the network with respect to time;
    using the positional data to determine a count of the navigation or driver assistance devices in a sequence of consecutive navigation or driver assistance devices that have selected a given one of the set of two or more alternative incoming navigable elements from among the incoming navigable elements of the set;
    comparing the count to a predetermined threshold to determine whether another one of the set of two or more alternative incoming navigable elements at the node is closed, wherein the threshold is specific to the incoming navigable element in relation to which the count of navigation or driver assistance devices is determined; and
    identifying the other one of the set of two or more alternative incoming navigable elements as being closed when the count exceeds the threshold.

2. The method of claim 1, wherein the threshold is set to result in a determination of the existence of a closure only when the number of navigation or driver assistance devices in a determined count of a consecutive sequence of navigation or driver assistance devices selecting the given navigable element exceeds by a statistically significant amount a number expected in the absence of a closure affecting another one of the set of navigable elements.

3. The method of claim 1, wherein the threshold is set by reference to a relative probability of the given one of the set of alternative navigable elements being selected from among the set of alternative navigable elements.

4. The method of claim 3, wherein the relative probability is a historical relative probability, based, at least in part, upon positional data relating to the movement of a plurality of navigation or driver assistance devices along each one of the set of two or more alternative navigable elements at the node with respect to time.

5. The method of claim 1, wherein the one or more navigable elements of the set of two or more alternative incoming navigable elements are each represented by one or more navigable segments in a geographical region covered by a digital map, the method further comprising:
    defining a geographical area covered by the map containing the or each navigable segment representing the navigable element determined to be affected by a closure;

comparing a number of the navigation or driver assistance devices whose positions can be matched to a navigable segment of the digital map data throughout movement through the geographical area to a number of navigation or driver assistance devices whose positions cannot be matched to a navigable segment of the digital map within the geographical area throughout movement through the geographical area; and using the results of the comparison to validate a determined closure.

6. The method of claim 5, comprising at least one of:

determining that the determined closure is not valid when the ratio of the number of navigation or driver assistance devices whose positions cannot be matched to a segment of the digital map throughout travel through the geographic area to the number of navigation or driver assistance devices whose positions can be matched to a segment of the digital map throughout travel through the geographic region exceeds a predetermined threshold; and validating the closure when the ratio of the number of navigation or driver assistance devices whose positions cannot be matched to a segment of the digital map throughout travel through the geographic area to the number of navigation or driver assistance devices whose positions can be matched to a segment of the digital map throughout travel through the geographic region is below a predetermined threshold.

7. The method of claim 1, further comprising associating data indicative of a determined closure with the navigable segment representing the navigable element affected in a digital map.

8. A non-transitory computer readable medium comprising computer readable instructions which, when executed by one or more processors of a computer, cause the computer to perform the method according to claim 1.

9. A method of detecting the closure of a navigable element forming part of a network of navigable elements within a geographic area, wherein the network of navigable elements comprises a plurality of navigable elements connected by a plurality of nodes, the method comprising:

obtaining positional data relating to the movement of a plurality of navigation or driver assistance devices from the plurality of navigation or driver assistance devices along each one of a set of two or more alternative outgoing navigable elements at a node of the network with respect to time;

using the positional data to determine a count of the navigation or driver assistance devices in a sequence of consecutive navigation or driver assistance devices selecting a given one of the set of two or more alternative outgoing navigable elements from among the outgoing navigable elements of the set;

comparing the count to a predetermined threshold to determine whether another one of the set of two or more alternative outgoing navigable elements at the node is closed, wherein the threshold is specific to the outgoing navigable element in relation to which the count of navigation or driver assistance devices is determined: and identifying the other one of the set of two or more alternative outgoing navigable elements as being closed when the count exceeds the threshold.

10. A non-transitory computer readable medium comprising computer readable instructions which, when executed by one or more processors of a computer, cause the computer to perform the method according to claim 9.

11. The method of claim 9, wherein the threshold is set by reference to a relative probability of the given one of the set of alternative navigable elements being selected from among the set of alternative navigable elements.

12. The method of claim 11, wherein the relative probability is a historical relative probability, and is based, at least in part, upon historical positional data relating to the movement of a plurality of navigation or driver assistance devices obtained from the plurality of navigation or driver assistance devices along each one of the set of two or more alternative navigable elements at the node with respect to time.

13. The method of claim 9, wherein the one or more navigable elements of the set of two or more alternative outgoing navigable elements are each represented by one or more navigable segments in a geographical region covered by a digital map, the method further comprising:

defining a geographical area covered by the map containing the or each navigable segment representing the navigable element determined to be affected by a closure;

comparing a number of navigation or driver assistance devices whose positions can be matched to a navigable segment of the digital map data throughout movement through the geographical area to a number of navigation or driver assistance devices whose positions cannot be matched to a navigable segment of the digital map within the geographical area throughout movement through the geographical area; and using the results of the comparison to validate a determined closure.

14. The method of claim 13, comprising at least one of:

determining that the determined closure is not valid when the ratio of the number of navigation or driver assistance devices whose positions cannot be matched to a segment of the digital map throughout travel through the geographic area to a number of navigation or driver assistance devices whose positions can be matched to a segment of the digital map throughout travel through the geographic region exceeds a predetermined threshold; and validating the closure when the ratio of the number of navigation or driver assistance devices whose positions cannot be matched to a segment of the digital map throughout travel through the geographic area to a number of navigation or driver assistance devices whose positions can be matched to a segment of the digital map throughout travel through the geographic region is below a predetermined threshold.

15. A system for detecting the closure of a navigable element forming part of a network of navigable elements within a geographic area, wherein the network of navigable elements comprises a plurality of navigable elements connected by a plurality of nodes, the system comprising one or more processors operable to:

obtain positional data relating to the movement of a plurality of navigation or driver assistance devices from the plurality of navigation or driver assistance devices along each one of a set of two or more alternative incoming navigable elements at a node of the network with respect to time;

use the positional data to determine a count of the navigation or driver assistance devices in a sequence of consecutive devices that have selected a given one of the set of two or more alternative incoming navigable elements from among the incoming navigable elements of the set;

compare the count to a predetermined threshold to determine whether another one of the set of two or more alternative incoming navigable elements at the node is closed, wherein the threshold is specific to the incoming navigable element in relation to which the count of navigation or driver assistance devices is determined: and identify the other one of the set of two or more alternative incoming navigable elements as being closed when the count exceeds the threshold.

16. A system for detecting the closure of a navigable element forming part of a network of navigable elements within a geographic area, wherein the network of navigable elements comprises a plurality of navigable elements connected by a plurality of nodes, the system comprising one or more processors operable to:

obtain positional data relating to the movement of a plurality of navigation or driver assistance devices from the plurality of navigation or driver assistance devices along each one of a set of two or more alternative outgoing navigable elements at a node of the network with respect to time;

use the positional data to determine a count of navigation or driver assistance devices in a sequence of consecutive navigation or driver assistance devices selecting a given one of the set of two or more alternative outgoing navigable elements from among the outgoing navigable elements of the set;

compare the count to a predetermined threshold to determine whether another one of the set of two or more alternative outgoing navigable elements at the node is closed, wherein the threshold is specific to the outgoing navigable element in relation to which the count of devices is determined; and identify the other one of the set of two or more alternative outgoing navigable elements as being closed when the count exceeds the threshold.

* * * * *